United States Patent [19]

Jabor

[11] 4,389,599
[45] Jun. 21, 1983

[54] LIGHT SWITCH DELAY CIRCUIT

[76] Inventor: Tony Jabor, 9001 Galena, El Paso, Tex. 79904

[21] Appl. No.: 395,654

[22] Filed: Jul. 6, 1982

Related U.S. Application Data

[63] Continuation-in-part of Ser. No. 160,095, Jun. 16, 1980, Pat. No. 4,339,696.

[51] Int. Cl.³ ............................................. H05B 39/00
[52] U.S. Cl. .................................... 315/360; 307/141; 315/199; 315/291
[58] Field of Search ............... 315/194, 199, 291, 360, 315/362; 307/141, 141.4, 252 N, 293; 323/323; 361/196

[56] References Cited

U.S. PATENT DOCUMENTS

| | | | |
|---|---|---|---|
| 3,732,484 | 5/1973 | McKenna | 307/141 |
| 4,082,961 | 4/1978 | Genuit | 315/194 X |
| 4,204,149 | 5/1980 | Cleary et al. | 315/360 X |
| 4,336,464 | 6/1982 | Weber | 307/141.4 |

Primary Examiner—Eugene R. La Roche
Attorney, Agent, or Firm—Arthur F. Zobal

[57] ABSTRACT

A delay circuit comprising two leads adapted to be connected across a light switch for delaying the turn off of a light bulb after the switch has been turned off. A silicon controlled rectifier (SCR) is connected across the two leads for applying power to the bulb when the SCR is on. An integrated circuit including an oscillator and a counter provides an output to the gate of the SCR for a predetermined time period following the opening of the switch for enabling the SCR to turn on.

4 Claims, 6 Drawing Figures

LIGHT SWITCH DELAY CIRCUIT

This application is a Continuation-In-Part application of U.S. patent application Ser. No. 160,095, filed June 16, 1980, now U.S. Pat. No. 4,339,696, issued July 13, 1982.

FIELD OF THE INVENTION

The present invention relates to a circuit for delaying the turn off of a light bulb after the light switch is turned off.

DESCRIPTION OF THE PRIOR ART

A need exists in homes for a device for delaying the turn off of a light bulb after the light switch is turned off. Such devices would find application in bedrooms, bathrooms, garages, for outdoor lights, etc. U.S. Pat. Nos. 3,732,484 and 4,082,961 disclose light switch delay turnoff circuits.

SUMMARY OF THE INVENTION

It is an object of the present invention to provide an improved circuit for delaying the turn off of a light bulb after the light switch is turned off.

The circuit comprises two leads adapted to be connected across a switch for delaying the turn off of a light bulb after the switch has been opened. A switching means is provided for turning the bulb on when said switching means is on and the switch is open. A control circuitry comprising an oscillator means and a counting means is provided. The counting means counts pulses from the oscillator means when said control circuitry becomes operative. Means responsive to the opening of the switch causes said control circuitry to become operative. When said control circuitry becomes operative, it applies an output to said switching means for enabling said switching means to turn on. The control circuitry terminates the output after a predetermined count is reached.

In a further aspect said means responsive to the opening of the switch for causing said control circuitry to become operative comprises a capacitor means for supplying power to said control circuitry. A resistor means is coupled to said capacitor means and to said second lead for quickly discharging said capacitor means when the switch is closed.

DESCRIPTION OF THE PREFERRED EMBODIMENTS

Figure 1:
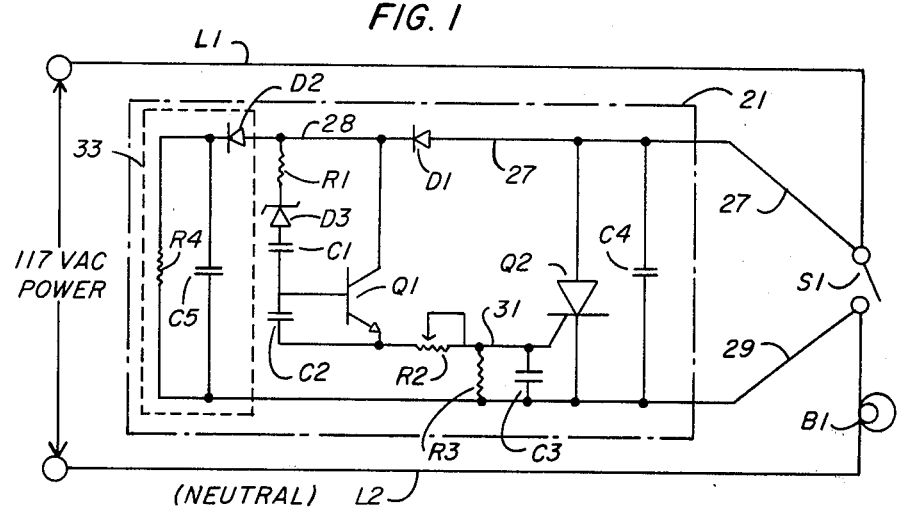
FIG. 1 is an electrical schematic of a light switch delay circuit.

Referring to FIG. 1, the light switch delay circuit is enclosed by dashed line 21. Switch S1 is a typical household light switch connected to A.C. voltage power leads L1 and L2 and B1 is an incandescent household light bulb. Leads 27 and 29 of the circuit 21 are connected to the two terminals respectively of switch S1. A silicon controlled rectifier Q2 has its anode connected to lead 27 and its cathode connected to lead 29. Capacitor C4 also is connected across the leads 27 and 29. A diode D1 is connected in lead 27 and an NPN transistor Q1 has its collector connected to lead 28. Also coupled to lead 27 by way of lead 28 is a resistor R1, a Zener Diode D3 and a timing or charging capacitor C1. The emitter of transistor Q1 is connected to the gate of SCR Q2 by way of lead 31 which includes a variable resistor R2. A capacitor C2 is connected between the base and emitter of Q1 and resistor R3 and capacitor C3 are connected between lead 31 and lead 29. Circuit 33 is a quick discharge circuit which comprises diode D2 connected to lead 28 and resistor R4 and capacitor C5 connected in parallel to the cathode of D2 and to lead 29.

When S1 is closed to turn "ON" the light, the light switch delay circuit 21 is shorted out through S1, and has no effect in controlling the lamp B1. When S1 is opened to turn "OFF" the light, the light switch delay circuit 21 is no longer shorted out, and it begins to control B1 in the following manner. As the voltage on power line L1 goes through the beginning of the positive portion of its cycle with reference to L2 (positive half cycle), capacitor C1 begins to charge through diode D1, resistor R1, diode D3, the base emitter-junction of transistor Q1, resistor R2, gate-cathode of SCR Q2, lamp B1 and L2. This charge current is quite small and its most noticeable effect is to turn Q1 "ON". Current will now flow through collector-emitter of Q1, R2, gate-cathode of Q2, turning Q2 "ON". Once Q2 is turned "ON" it will stay "ON" throughout the remainder of the positive half cycle.

When Q2 turns "ON" current will flow from L1 through the anode-cathode of Q2, B1 and L2 turning "ON" the lamp for the rest of the positive half cycle. Also because Q2 is now turned "ON", C1 charge current ceases, and Q1 is turned "OFF" for the remainder of this positive half cycle.

At the end of the positive half cycle, the line voltage reverses and the voltage on L1 goes negative and in so doing Q2 is forced to turn "OFF", and likewise B1. Throughout the negative portion of the cycle (negative half cycle), Q2 and B1 are "OFF". During the negative half cycle, D1 will block any reverse current attempting to flow through the circuitry of Q1, and also prevent C1 from discharging.

On the next positive half cycle of the voltage on L1 and each succeeding positive half cycle thereafter, the charging process of C1 is repeated until C1 accumulates a full charge. At this time, charge current ceases to flow and Q1 can no longer turn "ON". Q2 remains "OFF" and therefore B1 goes "OFF".

Because of the accumulating nature in the charging of C1, each succeeding positive half cycle is phase delaying the turn "ON" of Q1 and Q2. That is to say that Q2 is being turned "ON" at a later time period, with respect to the beginning time of each positive half cycle. This phase delay continues until C1 charges to the peak value of its applied voltage, at which time Q1 can no longer be turned "ON", and therefore, Q2 will not turn "ON" again upon completing the final positive half cycle.

The overall effect on lamp B1 is that as soon as S1 is opened, B1 will dim to approximately half power, and from that point on B1 will continue to get dimmer throughout its entire time delay interval. At the end of the timing interval, B1 will be down to approximately one quarter power, at which time it turns "OFF".

Because C1 is being charged in small increments of each positive half cycle of L1, relatively long time delays can be realized with a given value of C1. If these charging increments are made larger, C1 will charge sooner and the time delay period will be shorter. Increasing the value of R2, will make the charging increments larger. Thus R2 becomes a means of adjusting the delay period.

Once S1 has been opened to turn "OFF" B1 and the timing interval is over, C1 will remain in a charged condition for as long as S1 is opened. If S1 is now closed, C1 cannot discharge due to the blocking action of D1. Eventually, due to leakage current, C1 will slowly discharge providing S1 remains closed. A quick discharge of C1 is desirable when S1 is closed so that the whole timing period can be repeated shortly after S1 is closed. The quick discharge circuit 33 is intended for this purpose. This circuit has a negligible effect on the timing portion (circuitry of Q1) of the light switch delay circuit, when a timing interval is taking place. The discharge circuit 33 functions at the time S1 is closed to turn "ON" the light.

While a timing interval is taking place, capacitor C5 is being pulse charged in the same manner as C1. During portions of the timing interval when C5 is not being charged (when Q2 is "ON" or when L1 goes negative), C5 discharges a slight amount through resistor R4, however the R4, C5 time constant is large enough such that the net effect is to allow C5 to accumulate a charge during the timing interval. Blocking diode D2 prevents C5 from discharging through other parts of the circuit.

When the timing interval ends because C1 becomes fully charged, C5 will reach an equilibrium between its discharging through R5 and the replenishment of its charge with each positive half cycle of the voltage on L1. The net charge on C5 is sufficient to keep diode D2 reverse biased, except when C5 is being replenished, and therefore prevents C1 from trying to discharge through R4 during and after the timing interval. C5 will remain in this charged state as long as S1 remains open (light "OFF").

When S1 is closed to turn the light "ON", C5 can no longer have its charge replenished because S1 is shorting out the light switch delay circuit, and C5 begins to discharge through R4. As C5 is discharging, D2 will become forward biased due to the charge on C1 and therefore C1 also begins to discharge through R4. In a matter of several seconds, C5 and C1 are discharged to their initial state, and the timing interval is ready to begin again, whenever S1 is opened to turn the light "OFF".

Zener diode D3 is placed in the circuit to insure that C5 will charge to a higher voltage than C1, thus providing a larger voltage to reverse bias D2, and resulting in a higher noise immunity discharge circuit. Resistor R1, and capacitors C2, C3 and C4 are also used to provide a larger degree of noise immunity to other parts of the circuit. Resistor R3 is a gate termination recommended by manufacturers of SCR's such as Q2.

Figure 2:
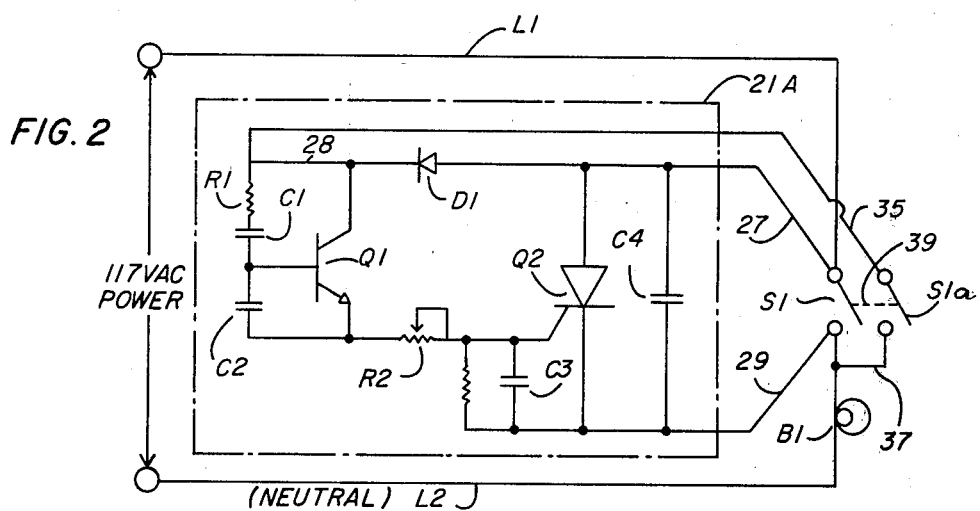
FIG. 2 is an electrical schematic of the embodiment of FIG. 1 with a different type of quick discharge circuit.

Referring to FIG. 2, the light switch delay circuit 21A is the same as circuit 21 except that an alternative quick discharge circuit has been substituted for circuit 33. The alternative quick discharge circuit comprises an auxiliary switch S1a having one terminal connected to lead 28 (between C1 and D1) by way of lead 35 and the other terminal connected to lead L2 by way of lead 37. Switches S1 and S1a are ganged together by way of connection 39.

Effectively S1 now becomes a double pole-single throw switch, however, auxiliary switch S1a does not carry load current. Its sole function is to discharge C1.

When S1 is closed to turn the light "ON", S1a likewise closes and C1 will discharge through R1 and auxiliary switch S1a in a very short time; setting up the light switch delay circuit for a timing interval whenever S1 is opened to turn "OFF" the light. This method of discharging C1 can lend itself into making the light switch delay circuit an integral part of switch S1. The use of auxiliary switch S1a would eliminate components C5, D2, D3 and R4 shown in FIG. 1, thus simplifing the circuit, and improving reliability.

Figure 3:
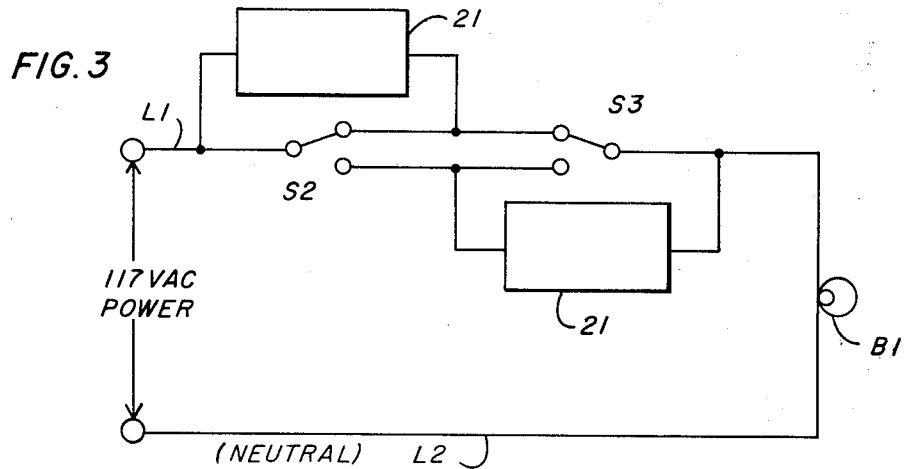
FIG. 3 illustrates two of the circuits of FIG. 1 connected with two three-way switches.

FIG. 3 illustrates the use of two light switch delay circuits 21 which can be used with three-way switch arrangement S2 and S3.

Figure 4:
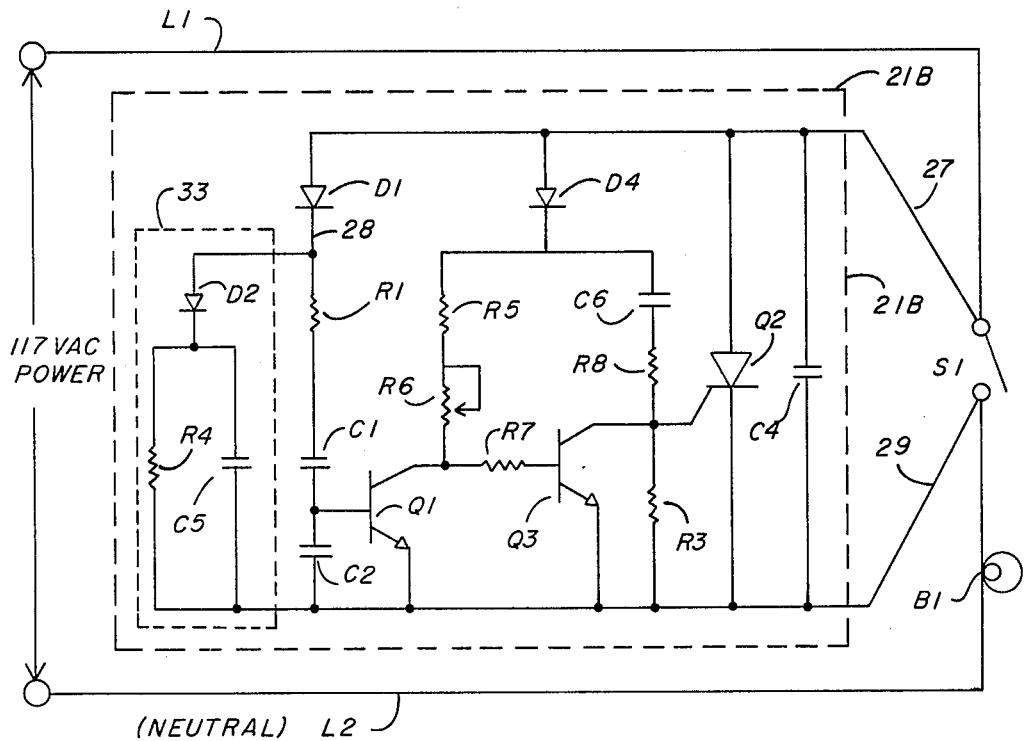
FIG. 4 is an electrical schematic of another embodiment of a light switch delay circuit.

Referring to FIG. 4, the light switch delay circuit 21B employs the same components of circuit 21 except that components C3, D3 and R2 have been omitted and the following components have been added: NPN transistor Q3, Diode D4, resistor R5, variable resistor R6, resistor R7, resistor R8, and capacitor C6. Components C4, D1, R1, C1, C2, Q1, D2, R4 and C5 perform the same function as previously explained in connection with FIG. 1. As seen, the collector of Q1 is coupled to the base of Q3 by way of resistor R7 and the collector of Q3 is connected to the gate of Q2. Diode D4 is connected to lead 27 and its cathode is coupled to the collector of Q3 and to the gate of Q2 by way of C6 and R8 and to lead 29 by way of R3. The cathode of D4 also is coupled to the collector of Q1 and to the base of Q3 by way of R5 and R6. The emitters of Q1 and Q3 are connected to lead 29.

When switch S1 is opened to turn "OFF" lamp B1, and as the voltage on power line L1 goes through the beginning of its positive half cycle (with reference to power line L2), capacitor C6 begins to charge. As will be discussed later, the direction in which the charge current of C6 is "steered" will determine whether lamp B1 will be "ON" or "OFF" after opening S1.

Transistor Q3 controls the direction in which the charge current of C6 is steered. If Q3 is "OFf", C6 begins to charge through diode D4, resistor R8, gate-cathode of Q2, turning Q2 "ON", and in turn turning "ON" lamp B1 for the remainder of the positive half cycle of the voltage on L1. When Q2 is turned "ON", capacitor C6 will discharge through resistors R5, R6, R7, base-emitter junction of Q3 and resistors R3 and R8. At the beginning of the next positive half cycle, C6 once again begins to charge and the same sequence of events is repeated. The charge path of C6 will remain the same as long as transistor Q3 remains "OFF".

Transistor Q3 is controlled by transistor Q1, and they are so connected such that whenever Q1 is "ON" Q3 is "OFF" and when Q1 is "OFF" Q3 is "ON". Transistor Q1 in turn is controlled by timing capacitor C1 whose function was explained previously. As C1 is accumulating a charge during a timing interval, Q1 is being turned "ON" during each positive half cycle of the voltage on the power line, and is therefore keeping Q3 from being turned "ON", and allowing B1 to be "ON" through anode to cathode of Q2.

When C1 becomes fully charged, the timing interval ends and Q1 can no longer come "ON". The base of Q3 is now receiving the current that previously was being shunted away by the collector-emitter of Q1 when it was "ON". Q3 can now turn "ON" at the beginning of each positive half cycle of the voltage on the power line. The base current to turn "ON" Q3 goes through D4, R5, R6, R7 and the base-emitter junction of Q3. With Q3 now being "ON", the charge current of C6 is steered away from the gate of Q2 and now is routed through the collector-emitter of Q3. Q2 can no longer turn "ON" and therefore lamp B1 will be extinguished.

For as long as switch S1 is "OFF" and the timing interval is ended, Q3 will be turned "ON" throughout each succeeding positive half cycle of the voltage on the power line, thus keeping Q2 and lamp B1 "OFF". Capacitor C6 likewise will keep the same charge path; charging through the collector-emitter of Q3; instead of through the gate-cathode of Q2.

The discharge path of C6 remains the same as before, however since Q2 is no longer being turned "ON", C6 will begin to discharge at such time that the voltage on the power line L1 begins its positive swing down toward zero voltage.

Changing the value of R6 will affect the loading of timing capacitor C1, and thus R6 becomes a means of adjusting the timing interval. R5 is a current limiting resistor for R6. R7 is used to help isolate C1 from the circuitry of Q3 and resistor R8 limits the charge current of C6. Diode D4 prevents reverse current from attempting to flow through Q1 and Q3 when the voltage on power line L1 becomes negative with reference to L2.

There are several advantages that the circuit of FIG. 4 has over the circuit of FIG. 1. In the circuit of FIG. 1, the collector-emitter of Q1 is exposed to the full power line voltage when switch S1 is opened and the timing interval is over. This necessitates that Q1 be a high voltage transistor, which makes it a more expensive device. In the circuit of FIG. 4, however, neither Q1 or Q3 has to withstand the full power line voltage under similar conditions, because of the way they are connected in the circuit. The combined price of Q1 and Q3 is less than that for one high voltage Q1.

The noise immunity of the circuit of FIG. 4 is considerably higher than that of FIG. 1, allowing the omission of diode D3 and capacitor C3 which were used in the circuit of FIG. 1 to give it a higher noise immunity. The higher noise immunity realized by the circuit of FIG. 4 is attributed to transistor Q3 being "ON" after switch S1 has opened and the timing interval is over. Through practically the entire time that the voltage on power line L1 is going through its positive half cycle, Q3 is "ON", absorbing any noise pulse that would otherwise gate Q2 "ON". Noise pulses appearing at the gate of Q2 when the voltage on power line L1 is negative and Q3 is "OFF", will not gate Q2 "ON" since the anode-cathode of Q2 is of the opposite polarity required to turn it "ON". With the addition of Q3 in the circuit of FIG. 4, Q1 is buffered, allowing a higher overall gain, thus requiring a smaller value of capacitor C1 for a given time delay period.

In the embodiment of FIG. 4, the quick discharge circuit of FIG. 2 comprising switch S1a and leads 35 and 37, may be substituted for the quick discharge circuit 33.

It is to be understood that the light switch delay circuit of the embodiments of FIGS. 1, 2 or 4 could be made an integral part of the light switch S1.

Figure 5:
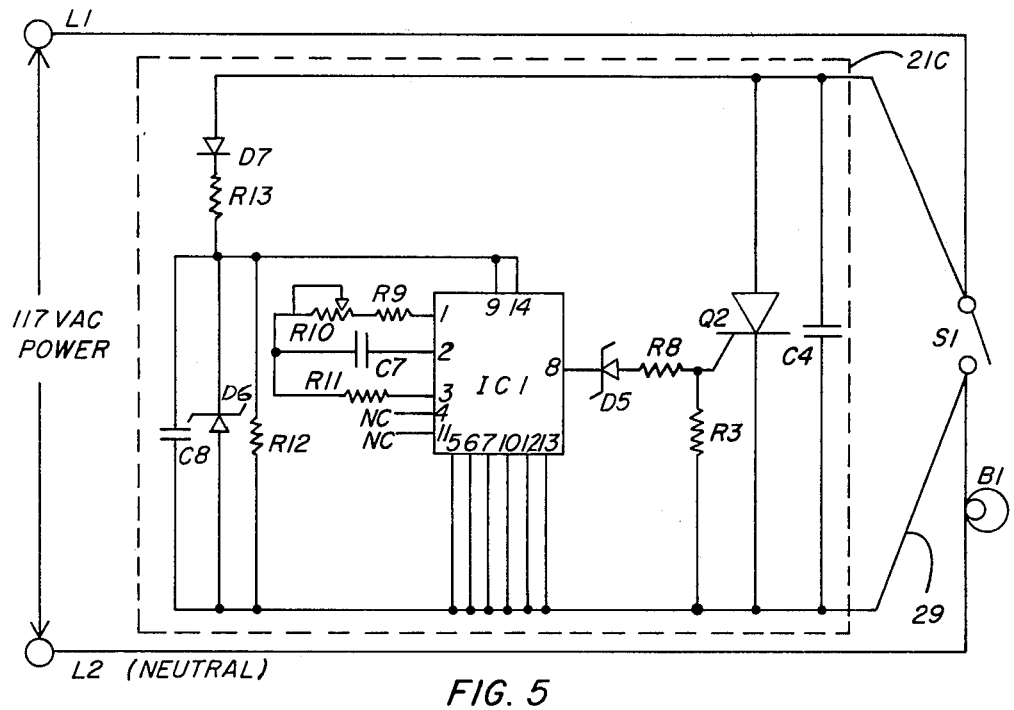
FIG. 5 is an electrical schematic of the light switch delay circuit of the present invention.

In the circuit of FIG. 5 the delay period is generated by counting the number of pulses being generated by an oscillator circuit. The light switch delay circuit 21C of FIG. 5 employs only Q2, R3, and C4 components in the same manner as the previous circuits. The delay function is obtained in this circuit by use of integrated circuit IC1 and its associated components. The integrated circuit IC1 includes an oscillator and a counter.

There are a variety of integrated circuits that can be used for IC1; however, in order to make a practical circuit, the use of an integrated circuit using the complementary metal oxide semiconductor (CMOS) technology is the most ideal integrated circuit to use. Within this technology there also exists several IC's that may be used for IC1.

One particular CMOS IC that lends itself well for this application is the Motorola MC14541B programmable oscillator-timer. The pin numbers shown on IC1 of FIG. 5 are those of an MC14541B. The programmable pins of IC1 are 5, 6, 9, 10, 12, 13. Pins 14 and 7 are the positive and negative supply pin connections, respectively. Pins 1, 2, and 3 are for the external components of the oscillator circuit, and pin 8 is the output pin.

Components D7, R13, C8, and D6 form a conventional half wave power supply to operate IC1. The output of this power supply is the junction point of R13, C8, and D6, and is referenced to lead 29. The following describes the circuit operation of FIG. 5 as shown.

When switch S1 is closed to turn "ON" the light, the light switch delay circuit 21C is shorted out through S1 and has no effect in controlling lamp B1. When S1 is opened to turn "OFF" the light, the light switch delay circuit 21C is no longer shorted out, and it begins to control B1 in the following manner. As the power supply voltage begins to build up to supply a voltage to pins 9 and 14 of IC1 (with reference to lead 29), an automatic reset circuit within IC1 will function and reset the counter of IC1 so that the counter will start from a zero count; the automatic reset circuit also causes output pin 8 to go high. At the end of the automatic reset period, the internal oscillator of IC1 is allowed to function and will oscillate at a frequency principally determined by the values of R9, R10 and C7.

Because the automatic reset circuit caused output pin 8 to go high, the voltage at pin 8 is nearly at the same level as the voltage at pin 14 (supply voltage). Current from pin 8 is supplied to the gate of Q2 through D5 and R8. Q2 will turn "ON" when the line voltage at L1 goes positive with reference to L2; and therefore turning "ON" lamp B1. When line voltage L1 goes negative Q2 is turned "OFF", and likewise lamp B1. During the negative half cycle of line voltage L1, the power supply continues to maintain operating voltage to IC1, so that IC1 is kept operative throughout the negative half cycle of line voltage L1 as well. With the next positive half cycle of line voltage L1, Q2 and lamp B1 are turned "ON" once again and this mode of operation will continue for as long as output pin 8 remains high.

When the internal oscillator of IC1 was allowed to begin oscillating, the counter within IC1 begins to count each cycle of the oscillator frequency (the counter counts during the positive and negative half cycles of line voltage L1) until the counter reaches its set programmed count. When the set count is reached, output pin 8 will go low, the output voltage will now drop to almost the same level as the voltage at pin 7 (the negative side of the power supply). Gate drive to Q2 is therefore turned "OFF" and Q2 and lamp B1 will turn "OFF" at such time that line voltage L1 goes through its negative half cycle. This ends the delay period; output pin 8 will remain low indefinitely until the next time switch S1 is closed and then opened again. The internal oscillator of IC1 continues to function, although the delay period is over; but does not have an affect on the state of output pin 8. The only time the oscillator is disabled is when switch S1 is closed or during the time IC1 is going through its automatic reset function.

The overall effect on lamp B1 is that as soon as S1 is opened, B1 will dim to approximately one third power and remain at this level throughout its entire time delay interval. At the end of the timing interval, B1 will turn "OFF".

By changing the frequency of the internal oscillator the time delay period can be varied. Resistor R10 is made adjustable for this purpose. To increase the time delay period, the value of R10 is increased; this will cause the oscillator frequency to decrease, making the internal counter take a longer time to reach its set count. By the same reasoning, decreasing the value of R10 will decrease the time delay period.

Figure 6:
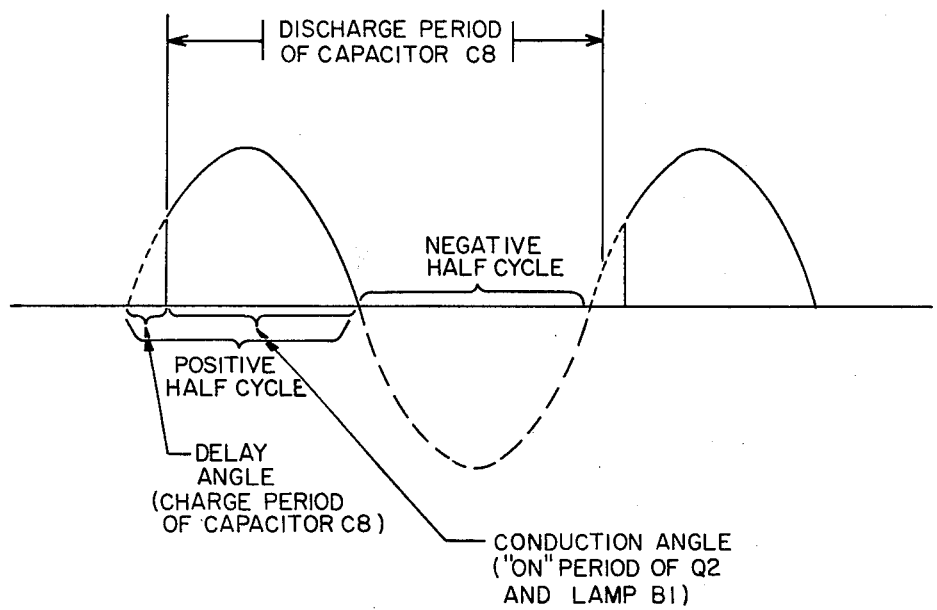
FIG. 6 is a waveform useful in understanding the circuit of FIG. 5.

The time period from the beginning of each positive half cycle of line voltage L1 and up until the time that Q2 is turned "ON", is called the delay angle. From the time that Q2 is turned "ON" within this positive half cycle of line voltage to the end of the positive half cycle is a time period called the conduction angle. The sum of these two time periods will therefore equal to the entire period of the positive half cycle of line voltage L1. See FIG. 6.

Only during the time of the delay angle period does capacitor C8 of the half wave power supply have to charge up. This charge on C8 must be enough to supply operating voltage to IC1 during the period of the conduction angle, when Q2 is "ON" and shorting out the input to the half wave power supply, and during the entire negative half cycle period of line voltage L1.

If the period of the delay angle is too short, capacitor C8 will not build up enough of a charge to maintain proper operating voltage to IC1 throughout the conduction angle period and the negative half cycle period, causing IC1 to malfunction. If the period of the delay angle is too long, capacitor C8 will have a more than sufficient charge to maintain a proper operating voltage to IC1; however the period of the conduction angle will probably not be long enough to keep Q2 "ON" too long, thus lamp B1 will not be "ON" too long either, and the brightness of lamp B1 will be reduced.

A compromise between the delay angle and the conduction angle is therefore needed to maintain a proper functioning circuit and one whose lamp B1 will have reasonable brightness.

The value of resistor R8 will determine the conduction angle and therefore the delay angle as well. The greater the value of R8, the smaller will be the gate drive current to Q2 and the smaller the conduction angle will be. By properly setting the value of resistor R8, a good compromise can be made.

A gate characteristic of SCR's such as Q2 is that as its temperature goes up its gate sensitivity likewise goes up. This means that less gate drive current is required to turn "ON" Q2 as its temperature goes up. The temperature of Q2 will vary as the wattage rating of lamp B1 varies. If circuit 21C of FIG. 5 is to allow the use of a wide range of wattages for lamp B1, then a wide range of temperature for Q2 must be accommodated.

Selecting the value of resistor R8 for a proper compromise narrows the wattage range that can be used for lamp B1, because as a larger wattage lamp is used, the temperature of Q2 goes up and likewise the gate sensitivity of Q2. Now the delay angle becomes smaller, and the halfwave power supply voltage (operating voltage) to IC1 begins to drop. If the operating voltage drops too low, IC1 will malfunction. The relationship, therefore between the temperature of Q2 and the halfwave power supply output voltage is such that as Q2 temperature goes up, power supply output voltage goes down.

When output pin 8 is high, as when a timing interval is taking place, the output voltage of pin 8 is very nearly the same as the halfwave power supply output voltage (pin 14), and will vary as the halfwave power supply voltage. Thus the gate drive current to Q2 is reduced as the temperature of Q2 increases; the delay angle will therefore increase, and the halfwave power supply output voltage will increase. This self compensating effect on the power supply output voltage, however, is not quite enough to attempt to keep the power supply voltage within working limits of IC1 as the temperature of Q2 goes up.

Zener diode D5 is placed in series with output pin 8 to alleviate this aforementioned problem. It accomplishes its purpose in the following manner. As the output voltage at pin 8 begins to decrease due to the temperature of Q2 going up, it begins to approach the zener voltage rating of D5 and in so doing the gate drive current to Q2 will be reduced sufficiently to maintain a more constant power supply output voltage. Zener diode D5, therefore functions in such a way as to appear that resistor R8 is being automatically varied to maintain a more constant delay angle and likewise a more constant power supply output voltage. The use of zener diode D5 increases the flexibility of circuit 21C allowing the use of a wide range of wattage ratings for lamp B1, within the limitation of Q2.

In order to have a quick discharge halfwave power supply, so that repeated time delay intervals can take place without a long wait, resistor R12 is placed in the circuit of 21C and the value of capacitor C8 is kept at a minimum. This will allow rapid discharge of C8 whenever switch S1 is turned "OFF".

The circuit of FIG. 5 is preferred circuit over those of FIGS. 1, 2, and 4 because diodes D1 and D2 of these circuits must be low leakage diodes for proper operation; the leakage current of these diodes is dependent on its temperature, and increases as their temperature increases.

I claim:

1. A delay circuit adapted to be connected across a light switch for maintaining an electric light bulb on for a given time after the switch has been opened, and wherein the switch has two terminals connected to two leads respectively to which A.C. voltage is applied, with the bulb being connected to one of said leads, said delay circuit comprising:

a first lead adapted to be connected to one terminal of the switch, a second lead adapted to be connected to the other terminal of the switch, a switching means connected to said first and second leads respectively for turning the bulb on when said switching means is on and the switch is open, control circuitry comprising an oscillator means and a counting means, said counting means counting pulses from said oscillator means when said control circuitry becomes operative, means responsive to the opening of the switch for causing said control circuitry to become operative, when said control circuitry becomes operative, said control circuitry applies an output to said switching means for enabling said switching means to turn on, said control circuitry terminating the output after a predetermined count is reached.

2. The delay circuit of claim 1, wherein said means responsive to the opening of the switch for causing said control circuitry to become operative comprises a capacitor means.

3. The delay circuit of claim 2, comprising:

a resistor means coupled to said capacitor means and to said second lead for quickly discharging said capacitor means when the switch is closed.

4. The delay circuit of claims 1, 2, or 3 wherein said switching means has an anode, a cathode, and a gate, with said anode and cathode connected to said first and second leads respectively, said control circuitry applying said output to said gate when said control circuitry becomes operative.

* * * * *